United States Patent

[11] 3,619,069

| [72] | Inventor | John Alexander<br>Wilmington, Del. |
|---|---|---|
| [21] | Appl. No. | 817,872 |
| [22] | Filed | Apr. 21, 1969 |
| [23] | | Division of Ser. No. 717,067,<br>Mar. 12, 1968, which is a continuation-in-part of Ser. No. 632,279, Apr. 20, 1967, abandoned |
| [45] | Patented | Nov. 9, 1971 |
| [73] | Assignee | Technidyne, Inc.<br>Wilmington, Del. |

[54] OPTICAL ALIGNMENT METHOD AND MEANS UTILIZING COORDINATED LASER BEAMS AND LASER BEAM COORDINATING MEANS FOR SAME
12 Claims, 9 Drawing Figs.

[52] U.S. Cl. .................................................. 356/138,
33/46 AT, 331/94.5
[51] Int. Cl. ....................................................... G01b 11/27
[50] Field of Search .......................................... 356/138,
152; 33/46 AT

[56] References Cited
UNITED STATES PATENTS

| 3,321,248 | 5/1967 | Williamson et al. | 356/153 |
| 3,437,825 | 4/1969 | Studebaker | 356/152 |
| 3,469,919 | 9/1969 | Zellner | 331/94.5 |
| 3,471,234 | 10/1969 | Studebaker | 356/3 |

OTHER REFERENCES

Laser Instruments for Engineering Construction, Spectra-Physics Data Sheet, 9/1967
B. Feinberg, Laser Tooling Goes to Work, Tool and Manuf. Eng., Oct. 67, pp. 52–56

Primary Examiner—Ronald L. Wibert
Assistant Examiner—J. Rothenberg
Attorney—Birch and Birch ABSTRACT: A laser projection device is provided which includes a tubular housing having a lasing chamber and symmetrically disposed optics at each end of the housing and chamber, effecting propagation of laser beams from each end of the housing in opposed straight line relationship. Another embodiment includes an additional outer housing having beam bending pentaprism optics for projecting the initially opposed laser beams in parallel planes and at least one beam splitting device for creating opposed beams in straight line configuration from at least one of the initially opposed beams in at least one of the parallel projection planes. The pentaprism optics are adjustable to effect either parallel or predetermined skew orientation of the several beams in the projection planes. Both embodiments are provided with telescopes or other optical viewing devices for determining a condition of impingement of the laser beams on a remote target by the visual detection of a red glow emitted from such a target when such an impingement occurs.

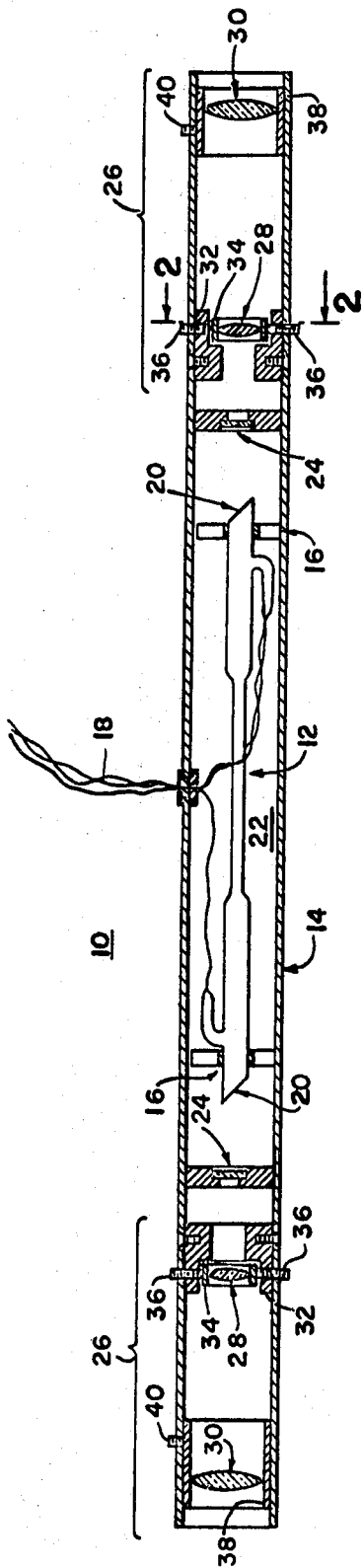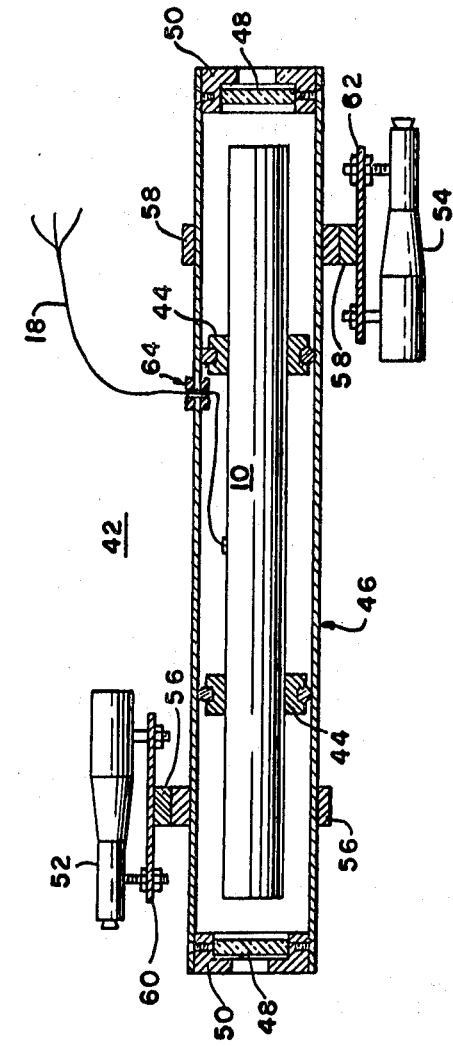

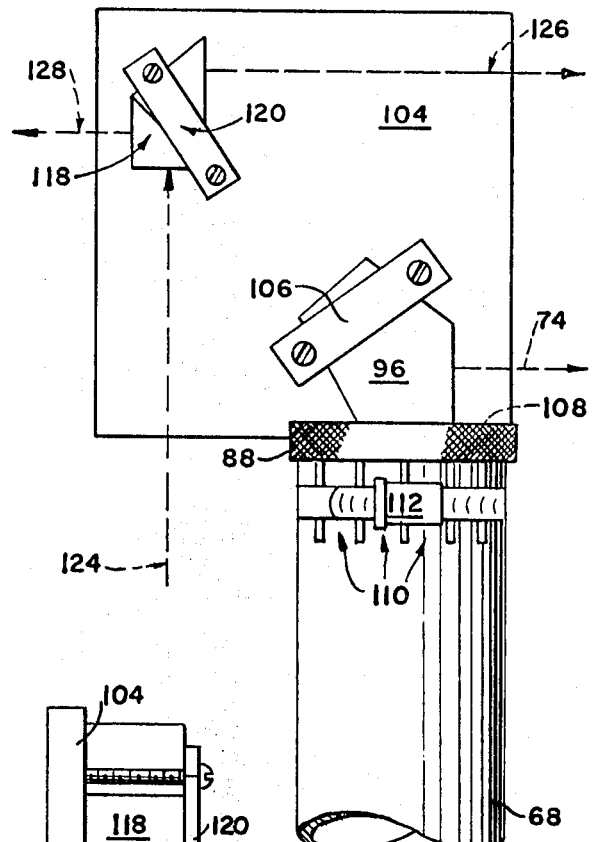
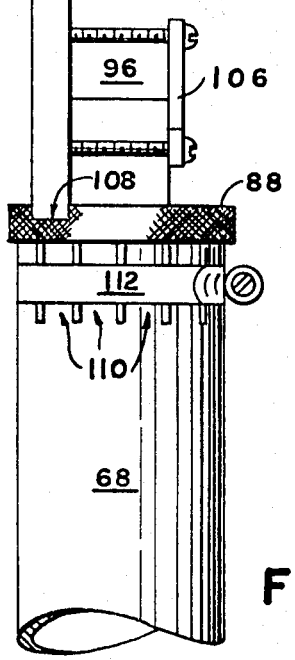
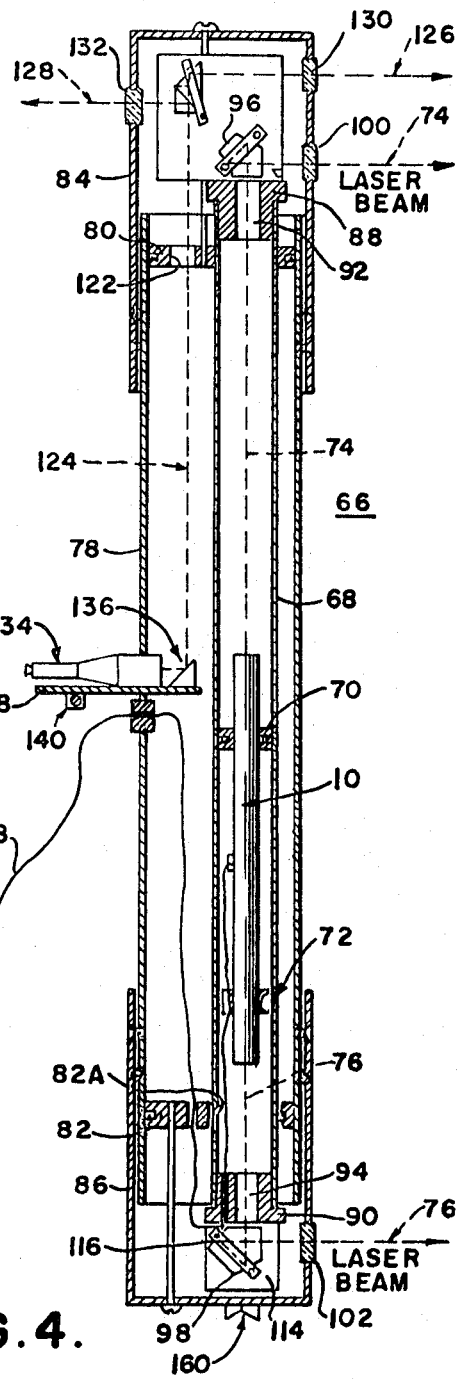

PATENTED NOV 9 1971 3,619,069

JOHN ALEXANDER, Inventor

By Birch & Birch
Attorney 3,619,069

OPTICAL ALIGNMENT METHOD AND MEANS UTILIZING COORDINATED LASER BEAMS AND LASER BEAM COORDINATING MEANS FOR SAME

This application is a divisional application of application Ser. No. 717,067 which is a continuation-in-part of my previous application, Ser. No. 632,279, filed Apr. 20, 1967 now abandoned for "Optical Alignment Methods and Means Utilizing Coordinated Laser Beams and Laser Beam Coordinating Means For Same."

This invention relates to optical alignment methods and means for providing an optical straight edge and reference in three-dimensional environments such as grading, pipe laying and the like.

More particularly, this invention relates to new and novel laser beam coordinating means whereby precise orientation of two or more laser beams, which may or may not include a reference beam, can be readily and selectively effected.

It is an object of this invention to provide a laser device having optical adjusting means incorporated therein to effect the emission of two laser beams in opposite directions therefrom and wherein said beans are controllable to effect precise 180° alignment thereof.

Another object of this invention is to provide a system including a laser device emitting two laser beams in 180° alignment to provide an optical straight edge in three-space applications.

Still another object of this invention is to provide a new and novel optical alignment system comprising a laser device emitting two laser beams in a preselected angular alignment, reference target means for each of said beams, said reference target means including reflective means, and optical viewing means permitting selective optical registry of said laser beams with said reference target means.

Still another object of this invention is to provide a laser device providing two constantly displaced parallel laser beams.

Still another object of this invention is to provide a laser device providing two constantly displaced parallel laser beams comprising laser means emitting first and second laser beams in 180° alignment, and optical transmitting means including first and second pentaprism means, respectively, directing said laser beams into three-space in parallel relationship.

Yet another object of this invention is to provide an optical alignment system comprising a laser device providing first and second parallel laser beams, first and second reference target means, respectively, for said laser beams, said reference target means, including reflective means, and optical viewing means permitting selective optical registry of said laser beams with said reference target means.

Yet another object of this invention is to provide new and novel laser beam coordinating means whereby precise orientation of two or more laser beams, which may or may not include a reference beam, can be readily and selectively effected.

These and other objects of this invention will become more readily and fully apparent with reference to the following specification and drawings which define several preferred embodiments of this invention.

In the drawings:

FIG. 1 is a side elevation in partial cross section of a two beam laser device of the present invention;

FIG. 2 is a cross section taken along line 2—2 of FIG. 1;

FIG. 3 is a side elevation in partial cross section of the laser device of FIG. 1 incorporated in double beam projecting and viewing device;

FIG. 4 is a side elevation in partial cross section of the laser device of FIG. 1 incorporated in a parallel beam projecting and viewing device;

FIG. 5 is an enlarged detail drawing of a prism mount in embodiment of FIG. 4;

FIG. 6 is an end view of the detail of FIG. 5;

DOUBLE-BEAM LASER

Figure 8:
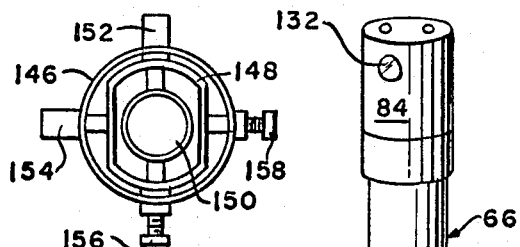
FIG. 8 is a top plan view of a gimbal detail of the mounting means of FIG. 7.

Referring in detail to the drawings and more particularly to FIG. 1, a preferred embodiment of a double-beam laser unit adapted for use in the present invention will now be described.

The laser unit 10 is generally comprised of an elongated gas discharge tube 12 coaxially mounted in an outer cylindrical protective housing 14 by means of an elastomeric shock absorbing mounting 16 at each end thereof and energized from a suitable source (not shown) through anode and cathode leads 18. The gas discharge tube 12 has an optical transmittance device known as a Brewster window 20 at each end thereof, thereby virtually eliminating reflection losses within the lasing cavity.

The lasing cavity 22 which encloses the gas tube 12 is defined at each end thereof by a partially reflective mirror 24, which may be comprised of a dielectric reflector effecting 96.0 percent or greater reflection of the proper light frequency to effect lasing, whereby both light reflection into the cavity 22 and light transmission out of the cavity 22 can be effected. The outer shell 14 comprises the remaining defining boundary for the lasing cavity 22.

The transmission of light out of the cavity 22 is substantially axial of the outer shell 14 and bidirectional, the light intensity in both directions being mad substantially equal by preselection of the transmittance and reflectance qualities of the mirror 24.

Light transmitted axially through the Brewster windows 20 and partially reflective mirrors 24 is then transmitted axially through telescope optics 26, located one in each end of the outer shell 14.

The telescope optics 26 each comprise an internal lens 28 and an external objective lens 30. These two lenses comprise a collimating, alignment and focusing means. The internal lens 28 is mounted in a fixed mounting ring 32 and an inner adjustable sleeve 34, the latter being displaceable transversely of the axis of the outer shell 14, in the mounting ring 32, by means of a plurality of setscrews 36 or the like in the said mounting ring. This is shown in more detail in FIG. 2, where all the above-defined elements are shown in plan view.

The objective lenses 30, referring again to FIG. 1, are mounted in internally disposed, axially adjustable sleeves 38 in the outer shell 14, with setscrews 40 being provided to fix the said sleeves 38 in the desired position.

In operation, when connected with a suitable power supply, the gas tube 12 is energized and the lasing cavity 22 emits coherent light through the partially reflective mirrors 24, the emitted light being collimated, aligned and focused by the internal lenses 28 and objective lenses 30. By proper positioning of the internal lenses 28 the laser device 10 emits laser beams from each end thereof which are oriented in full 180° opposition, i.e., in complete opposed alignment through the laser device 10 and through space.

STRAIGHT LINE LASER BEAM PROJECTOR ASSEMBLIES

Referring to FIG. 3, a first preferred embodiment of a laser beam projector assembly 42 is shown generally comprising a double-beam laser device 10 axially mounted in concentric elastomeric ring mounts 44 within a concentric projector housing or telescope tube 46. The telescope tube 46 is closed at each end with optical windows 48 in concentric mounts 50, the said windows 48 being in a plane inclined at a slight angle to the longitudinal axis of the laser device 10 to reduce reflections.

First and second telescopic sighting means 52 and 54 are mounted, respectively, adjacent opposite ends of the telescope tube 46 in substantially the same horizontal plane. First and second mounting rings 56 and 58 are provided for the first and second sighting means 52 and 54, respectively. The said rings are externally fixed to the telescope tube 46 and are provided, respectively, with scope brackets 60 and 62 adapted to detachably and securely mount the said sighting means 52 and 54 adjacent the telescope tube 46.

The power leads 18 for the laser device 10 pass through a rubber grommet 64 in the wall of the telescope tube 46.

The laser beam projector 42 is preferably used by clamping the midpoint of the telescope tube 46, in place of a conventional telescope tube, in an altitude/azimuth mechanism conventionally used with astronomical telescopes and the like. The altitude/azimuth device can then be mounted on either end of a conventional elevator post of a standard photographic tripod mount.

The power supply can be any suitable generator means conventionally known in the electronic art which, for example, is designed to supply 7.5 volts AC for the cathode and up to 6500 volts DC for the anode of the laser device 10 via the leads 18.

For field use of the laser projector assembly, gasoline motor generator means or battery inverter means can be utilized to provide complete portability.

Referring to FIGS. 4, 5 and 6, a second preferred embodiment of a laser beam projector 66 for providing parallel laser beam projections will now be described.

As in the previous embodiment of FIG. 3, the source of the laser beam is the laser device 10 which is axially mounted in a first, externally concentric, elongated tube 68 by means of elastomeric shock-absorbing O-rings 70 and 72.

In this embodiment, the laser device 10 projects its opposed beams indicated by phantom lines 74 and 76, along a vertical axis.

The first mounting tube 68 is mounted adjacent the longitudinal axis of and internally of elongated second mounting tube 78 which forms the outer protective cover means for the projector assembly 66. Upper and lower integral support rings 80 and 82, respectively, having bores therein offset from the axis of the second tube 78 are provided to fixedly retain the first mounting tube 68 within the second mounting tube 78. The upper support ring 80 holds the inner mounting tube 68 in rigid fixed engagement with the outer mounting tube 78. However, the lower support ring 82 engages the periphery of the inner mounting tube 68 through a sliding O-ring 82A, whereby, distortions of or damage to the outer mounting tube 78 are precluded from affecting the precise optical alignment of the inner mounting tube 68.

The outer mounting tube 78 is provided with upper and lower housing collars 84 and 86, respectively, which include optical systems, to be hereinafter more fully described, for selectively directing the beams emitted from the laser device 10 in the inner mounting tube 68.

The inner tube 68 receives, at top and bottom, upper and lower prism plugs or caps 88 and 90 having optical bores 92 and 94 therein, respectively, in substantial axial alignment with the emitted beams 74 and 76 of the laser device 10.

Mounted in line with the bores 92 and 94 are first and second pentaprisms 96 and 98, respectively, in optical alignment with first and second glass windows 100 and 102, respectively. The said first and second windows 100 and 102 are mounted in the outer walls of the upper and lower housing collars 84 and 86, respectively, and face in substantially the same direction.

Referring additionally to FIGS. 5 and 6, the prism cap 88, first pentaprism 96 and the various interrelationships thereof will now be described in detail. It is to be expressly understood that the lower prism cap 90 and second pentaprism 94 are in the identical interrelationship at the lower end of the inner mounting tube 68.

The first pentaprism 96 is mounted on a first prism plate 104 by means of a first holding clamp 106. The first prism plate 104 is held in a receiving slot 108 in the upper prism cap 88.

The upper end of the inner mounting tube 68 is furcated as shown at 110 and receives a ring clamp 112 about the said furcated portion 110 for the purpose of securing the upper prism cap 88 therein against rotation and to permit selective rotational positioning of the first prism plate 104 and first pentaprism 96 for a purpose to be hereinafter more fully described.

As generally shown in FIG. 4, the inner mounting tube 68 adjustably mounts the lower prism cap 90, which mounts a second prism plate 114, which in turn mounts the second pentaprism 98 by means of a second holding clamp 116 in the same configuration as the upper prism cap 88, first prism plate 104, first pentaprism 96 and first holding clamp 106.

Referring again to FIGS. 4, 5 and 6, the first prism plate 104 mounts a prismatic beam splitter 118, by means of a third holding clamp 120, the said beam splitter being in optical alignment with an optical bore 122 in the upper mounting ring 80 and hence, the interior of the outer mounting tube 78, as shown by the phantom lined light beam 124.

The beam splitter 118 causes forward and reverse light beams 126 and 128 (phantom lined) to be transmitted and/or received through forward and reverse viewing windows 130 and 132, respectively, in the upper housing collar 84.

As shown in FIG. 4, a viewing telescope 134 is provided perpendicular to the vertical axis of and approximately at the midpoint of the beam projector assembly 66, and is optically coupled with the light beam 124 within the outer mounting tube 78 by means of a 45° mirror 136 integrally mounted therewith on a telescope mounting plate 138. A bubble level 140 is provided on the telescope plate 138 to permit vertical attitude determination of the beam projector assembly 66.

Figure 7:
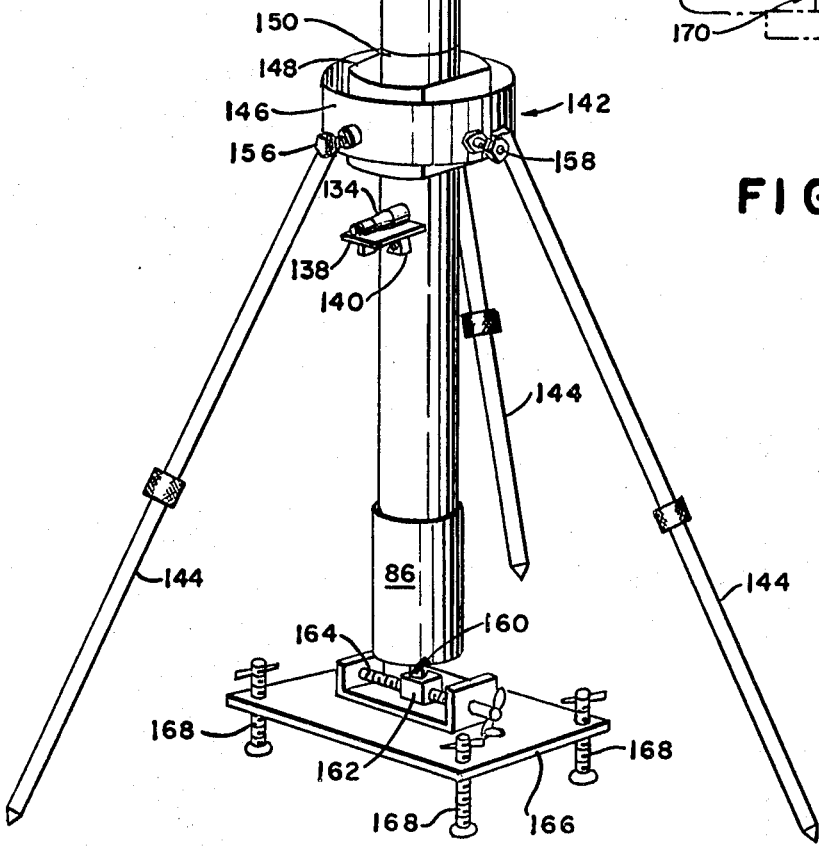
FIG. 7 is a side elevation of the embodiment of FIG. 4 in a mounting means for same.

Referring to FIGS. 7 and 8, the parallel laser beam projector assembly 66 is shown in a gimbal type tripod mount 142.

The mount 142 has telescoping legs 144 depending from a fixed outer ring 146, which encloses an intermediate gimbal ring 148 and an inner gimbal ring 150, the latter being in close circumferential contact with the outer mounting tube 78 of the projector assembly 66.

The gimbal rings 148 and 150 are adjustable about their respective pivots 152 and 154, by means of settable adjusting knobs 156 and 158, respectively, mounted in the fixed outer ring 146.

Referring to FIGS. 4, 7 and 8, there is a ball socket 160 provided on the bottom of the lower housing collar 86 which is adapted to be engaged by a traversing ball means 162 mounted on a traverse worm 164.

The traverse worm 164 is mounted on a bed plate 166 having a four point leveling assembly comprised of four height adjustable feet 168. The feet 168 and the legs 144 of the tripod 142 are adapted to engage the ground or other reference surfaces, whereby the lower end of the projector assembly 66 may be selectively displaced through the ball and traverse means 160–162–164 from any reference position of the baseplate 166.

In the projector assembly 66 of FIGS. 4, 5 and 6, the use of the pentaprisms 96–98 provides optical means whereby an incident beam is always transmitted by internal reflection at an angle of ninety degrees (90°) from its original incident direction.

Therefore, the only possible error between the two parallel laser beams 74 and 76, when emitted from the transmission windows 100 and 102, respectively, is one of skew. This is based on the fact that initially, the laser device 10, as previously described in FIG. 1, projects in-line laser beams 180° out of phase.

Therefore, by adjusting the rotational position of the upper prism cap 88, the first prism plate 104 and first pentaprism 96 re adjustable in the skew dimension relative to the direction of transmittance of the lower prism 98 and the lower laser beam 76. The two laser beams 74 and 76, since they are always transmitted in parallel planes, may be readily corrected for skew error and thus transmitted in fully parallel relationship through space.

Figure 9:
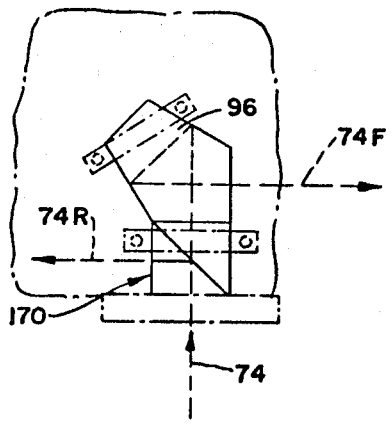
FIG. 9 is an enlarged partial detail of a pentaprism and combined beam splitter on a prism mount similar to that of FIGS. 4 and 5.

As schematically shown in FIG. 9, both forward and reverse transmission of a single laser beam at the first (upper) pentaprism 96 can be effected by incorporating a prismatic beam splitter 170 in the path of the incident laser beam 74. The beam 74 is divided into a reverse beam component 74R by the beam splitter 170 and into a forward beam component 74F, the latter being transmitted by the pentaprism 96.

The parallel beam projector assembly 66 is further stabilized by utilizing, in the inner mounting tube 68, material of high mechanical stability. Therefore, this stability in conjunction with the novel support ring mountings 80 and 82, precludes misalignment of the parallel planes of projections of the laser beams 74 and 76 because of vibrations, distortions of the outer mounting tube 78, motions of the laser device 10, motions of the pentaprisms 96 and 98 or motions of the inner mounting tube 68 per se. The only adjustment ever necessary, therefor, is in the skew dimension.

This may be readily effected by targeting the lower laser beam 76 on the lower end of a vertical standard or the like and then utilizing the viewing telescope 136 to target the upper laser beam 74 on the upper end of the same vertical standard, by adjusting the rotational position of the upper prism cap 88 as hereinbefore described.

A laser beam can be targeted by viewing the red glow emitted by the target device when the beam is impinged thereon. In the present invention, reflective means are included in the target devices to provide an optimum reflection of light energy back toward the source of the laser beam and the viewing telescope means associated therewith.

Thus, in all of the foregoing embodiments, the viewing telescopes 52, 54 and 136 can be utilized to detect proper targeting of a projected laser beam at substantial distance which would otherwise preclude such detention by the naked eye.

It becomes readily apparent, therefore, that the present invention provides optical straight edges comprised of precisely aligned multiple laser beams transmitted through space in a predetermined mutual relationship.

By the use of viewing telescopes and the targeting of one beam on any given fixed reference, other points in space may be readily and accurately located by the establishment of a target condition of the remaining beam or beams.

Therefore, such problems as surveying, grading, alignment of widely spaced objects, etc. may all be accomplished by the use of laser beams without the need for such cumbersome and inaccurate expedients as string lines, tapes and the like.

Furthermore, in all of the foregoing embodiments, the present invention provides lightweight, economical devices which provide multiple laser beams, and permit ready, selective and precise relative orientation of the multiple laser beams.

What is claimed is:

1. Laser beam projection means for providing and targeting at least two selectively oriented laser beams in three-space comprising a laser device for emitting first and second laser beams in substantially opposed preselected relative orientation, a housing, shock resistant mounting means in said housing selectively positioning said laser device internally thereof, optical transmittance means in said housing for transmitting said laser beams to the exterior thereof, and optical viewing means on said housing, selectively aligned with said laser beams to visually determine the existence of a targeted condition of said laser beams; wherein said laser beams are emitted from said laser device in opposed straight line relationship; and wherein said optical transmittance means comprises first and second pentaprism means in optical alignment with said first and second opposed laser beams, respectively, said pentaprism means transmitting said first and second laser beams from said projection means in respective parallel projection planes.

2. The invention defined in claim 1, wherein at least one of said pentaprism means further includes beam splitting means effecting multidirectional projection of a respectively associated one of said laser beams.

3. The invention defined in claim 2, wherein said pentaprism means include adjustable mounting means selectively positionable in rotation about said laser beams to effect selective positioning of said laser beams in said parallel projection planes.

4. Laser beam projection means for providing and targeting at least two selectively oriented laser beams in three-space comprising a laser device for emitting first and second laser beams in substantially opposed preselected relative orientation, a housing, shock resistant mounting means in said housing selectively positioning said laser device internally thereof, optical transmittance means in said housing for transmitting said laser beams to the exterior thereof, and optical viewing means on said housing, selectively aligned with said laser beams to visually determine the existence of a targeted condition of said laser beams; wherein said laser device comprises an elongated tubular structure emitting one of said opposed laser beams at each end thereof and wherein said mounting means comprises elongated tube means surrounding said laser device and substantially coaxial therewith, said tube means being comprised of dimensionally stable material, first spaced peripheral mounting means on said laser device juxtaposed with the said tube means internally thereof, and second spaced peripheral mounting means on said tube juxtaposed with said housing means internally thereof, predetermined ones of said peripheral mounting means including shock-absorbing materials; and wherein said optical transmittance means comprises first and second pentaprism means in optical alignment with said first and second opposed laser beams, respectively, and mounted at the ends of said tube means, said pentaprism means transmitting said first and second laser beams from said housing of said projection means in respective selected projection planes.

5. The invention defined in claim 4, wherein said laser device, said tube means and said housing are vertically disposed; wherein said first and second peripheral mounting means each comprise a pair of upper and lower mounting means; and wherein said lower mounting means include said shock-absorbing materials.

6. The invention defined in claim 4, wherein said first and second pentaprism means include first and second adjustable mounting means, respectively positioned at the ends of said tube means and rotatably mounted thereon, providing selective positioning of said pentaprisms in rotation about said laser beams to effect selective positioning of said laser beams in said projection planes.

7. The invention defined in claim 4, wherein said laser beams are emitted from said laser device in opposed straight line relationship; and wherein said first and second pentaprism means are so mounted at the ends of said tube means as to transmit said first and second laser beams from said housing of said projection means in respective parallel projection planes; wherein said laser device, said tube means and said housing are vertically disposed; wherein said first and second peripheral mounting means each comprise a pair of upper and lower mounting means; and wherein said lower mounting means include said shock-absorbing materials.

8. The invention defined in claim 4, wherein said laser beams are emitted from said laser device is opposed straight line relationship; and wherein said first and second pentaprism means are so mounted at the ends of said tube means as to transmit said first and second laser beams from said housing of said projection means in respective parallel projection planes; wherein said first and second pentaprism means include first and second adjustable mounting means, respectively positioned at the ends of said tube means and rotatably mounted thereon, providing selective positioning of said pentaprisms in rotation about said laser beams to effect selective positioning of said laser beams in said parallel projection planes; wherein said laser device, said tube means and said housing are vertically disposed; wherein said first and second peripheral mounting means each comprise a pair of upper and lower mounting means; and wherein said lower mounting means include said shock-absorbing materials.

9. Laser beam projection means for providing and targeting at least two selectively oriented laser beams in three-space comprising at laser device for emitting first and second laser beams in opposed straight line relationship;

a housing having said laser device mounted therein;

optical transmittance means in said housing comprising first and second optical beam directing means in optical alignment with said first and second opposed laser beams, respectively, said optical beam directing means transmitting said first and second laser beams from said housing in respective selective projection planes;

at least one of said projection planes being disposed transversely of the straight line of projection of said first and second laser beams and optical viewing on said housing, selectively aligned with at least one of said laser beams to visually determine the existence of a targeted condition of the laser beam.

10. The invention defined in claim 9, wherein at least one of said optical beam directing means includes adjustable mounting means selectively positionable in said housing to selectively position at least one of said laser beams within said projection plane thereof.

11. The invention defined in claim 9, wherein at least one of said beam directing means further includes beam splitting means effecting multidirectional projection of a respectively associated one of said laser beams.

12. The invention defined in claim 11, wherein said optical beam directing means include adjustable mounting means selectively positionable in said housing to effect selective positioning of said laser beams within said respective projection planes.

* * * * *